US011085886B2

United States Patent
Teleki

(10) Patent No.: US 11,085,886 B2
(45) Date of Patent: Aug. 10, 2021

(54) METHOD TO RADIOGRAPHICALLY DETERMINE GEOMETRICAL PARAMETERS AND/OR SUBSTANCE STATE OF AN OBJECT UNDER STUDY

(71) Applicant: Péter Teleki, Dunaújváros (HU)

(72) Inventor: Péter Teleki, Dunaújváros (HU)

( * ) Notice: Subject to any disclaimer, the term of this patent is extended or adjusted under 35 U.S.C. 154(b) by 0 days.

(21) Appl. No.: 16/320,675

(22) PCT Filed: Jul. 27, 2017

(86) PCT No.: PCT/HU2017/050030
§ 371 (c)(1),
(2) Date: Jan. 25, 2019

(87) PCT Pub. No.: WO2018/100404
PCT Pub. Date: Jun. 7, 2018

(65) Prior Publication Data
US 2019/0154596 A1 May 23, 2019

(30) Foreign Application Priority Data

Jul. 27, 2016 (HU) .................................. P1600469

(51) Int. Cl.
*G06T 7/174* (2017.01)
*G01N 23/04* (2018.01)
(Continued)

(52) U.S. Cl.
CPC ........... *G01N 23/04* (2013.01); *G01B 15/025* (2013.01); *G06T 7/0006* (2013.01); *G06T 7/12* (2017.01);
(Continued)

(58) Field of Classification Search
CPC ........... G01B 15/025; G01N 2223/628; G01N 2223/629; G01N 2223/633;
(Continued)

(56) References Cited

U.S. PATENT DOCUMENTS 3,521,059 A * 7/1970 Stolle ..................... G01N 23/04
378/59
5,648,996 A * 7/1997 Gupta .................... G01N 23/04
378/11
(Continued)

FOREIGN PATENT DOCUMENTS

CA          3031891       6/2018
CN          109791114      5/2019
(Continued)

OTHER PUBLICATIONS

International Search Report for PCT/HU2017/050030 dated Jul. 19, 2018; 3 pages.
(Continued)

*Primary Examiner* — Ian L Lemieux
(74) *Attorney, Agent, or Firm* — Fitch, Even, Tabin & Flannery LLP

(57) ABSTRACT

The present invention relates to a method to determine geometrical parameters of an object under study by radiography, the object can be described geometrically, wherein intercepts that go through the material of the object under study can be determined from a projection of the object—e.g. a tube—imaged by an X- or gamma-radiation source if exposition data of the radiographic image are available. These intercepts that go through the material of the object—i.e. the intercept curves—allow that the object under study—e.g. the tube—have a dimension that is larger than the dimension of the device (film/detector) used to take the radiographic image. During the course of said method, the source of radiation, the object under study and the device (film/detector) used to take the radiographic image are in a fixed position.

13 Claims, 6 Drawing Sheets

(51) Int. Cl.
*G01B 15/02* (2006.01)
*G06T 7/12* (2017.01)
*G06T 7/00* (2017.01)
*G06T 7/60* (2017.01)

(52) U.S. Cl.
CPC ............... *G06T 7/174* (2017.01); *G06T 7/60* (2013.01); *G01N 2223/628* (2013.01); *G01N 2223/629* (2013.01); *G01N 2223/633* (2013.01); *G01N 2223/646* (2013.01); *G06T 2207/10116* (2013.01); *G06T 2207/30164* (2013.01); *G06T 2207/30172* (2013.01)

(58) Field of Classification Search
CPC .............. G01N 2223/646; G01N 23/04; G06T 2207/10116; G06T 2207/30164; G06T 2207/30172; G06T 7/0006; G06T 7/12; G06T 7/174; G06T 7/60
See application file for complete search history.

(56) References Cited

U.S. PATENT DOCUMENTS

| | | | | |
|---|---|---|---|---|
| 5,864,601 | A * | 1/1999 | Cattorini | G01N 17/00 378/54 |
| 6,289,235 | B1 * | 9/2001 | Webber | A61B 6/12 378/23 |
| 6,373,917 | B1 * | 4/2002 | Roder | G01N 23/04 378/22 |
| 6,377,654 | B1 * | 4/2002 | Willems | G01B 15/025 250/358.1 |
| 6,600,806 | B1 | 7/2003 | Istar | |
| 6,665,433 | B2 * | 12/2003 | Roder | G06T 7/0004 382/106 |
| 2006/0058974 | A1 * | 3/2006 | Lasiuk | G01B 15/025 702/97 |
| 2009/0232275 | A1 | 9/2009 | Spartiotis | |
| 2010/0119103 | A1 * | 5/2010 | Ewert | G01B 15/045 382/100 |
| 2010/0214555 | A1 * | 8/2010 | Schmitt | G01B 11/0691 356/72 |
| 2015/0235357 | A1 * | 8/2015 | Nagashima | G06T 7/73 382/141 |

FOREIGN PATENT DOCUMENTS

| | | |
|---|---|---|
| EP | 128922 | 12/1984 |
| EP | 0201849 | 11/1986 |
| EP | 1072861 | 1/2001 |
| HU | 187820 | 2/1986 |
| WO | 8402399 | 6/1984 |

OTHER PUBLICATIONS

Written Opinion of the International Searching Authority for PCT/HU2017/050030 dated Jul. 19, 2018; 5 pages.

Reply to Written Opinion for PCT/HU2017/050030 dated Dec. 15, 2018; 3 pages.

Hecht, A. et al.; published electronically in NDT.net (see http://www.ndt.net/article/ecndt98/chemical/101/101.htm; Oct. 1998, vol. 3, No. 10) under the title "On-Line Radiographic Wallthickness-Measurement of Insulated Piping in the Chemical and Petrochemical Industry". 2 pages.

Redmer, B. et al.; published electronically in NDT.net (see http://www.ndt.net/article/ecndt02/308/308.htm; Dec. 2002, vol. 7, No. 12) under the title "Mechanised Weld Inspection by Tomographic Computer Aided Radiom-etry (TomoCAR)"; 7 pages.

GE Sensing Inspection Technologies under the title "Computed Radiography Plus Rhythm Software Delannoy, L.; GE Sensing & Inspection Technologies; Platform for FAC (Flow Accelerated Corrosion) Inspection in Nuclear Secondary Circuit"; conference proceedings of the 8th International Conference on NDE in Relation to Structural Integrity for Nuclear and Pressurized Components—We. 3.B.3 held in Berlin, Germany between Sep. 29 dnd Oct. 1, 2010; 16 pages.

International Report on Patentability for PCT/HU2017/050030 dated Feb. 12, 2019; 10 pages.

* cited by examiner

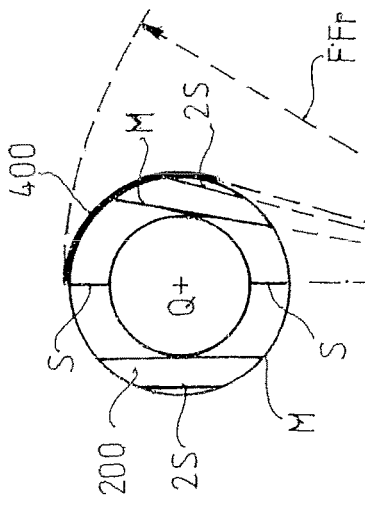
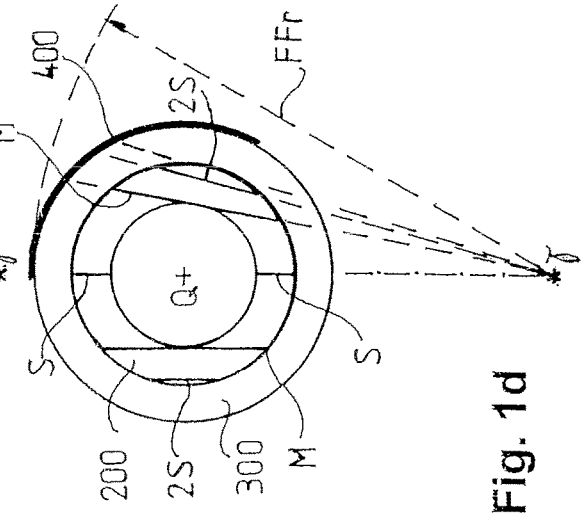
Fig. 1c
Fig. 1d
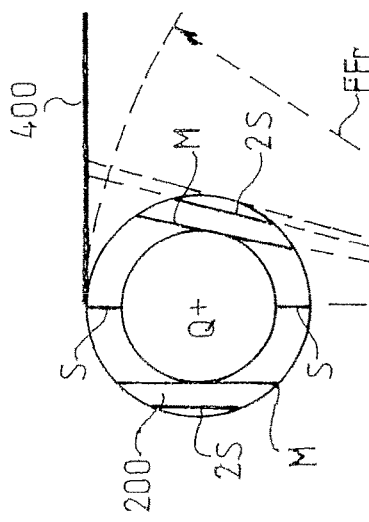
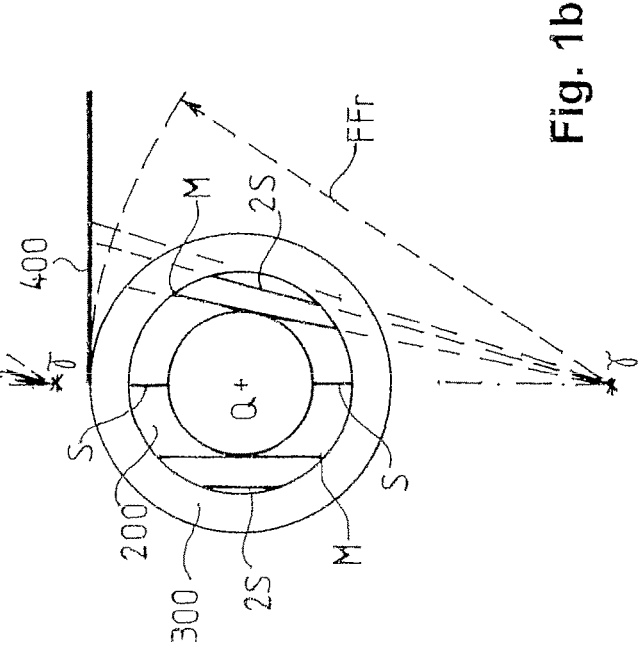
Fig. 1a
Fig. 1b

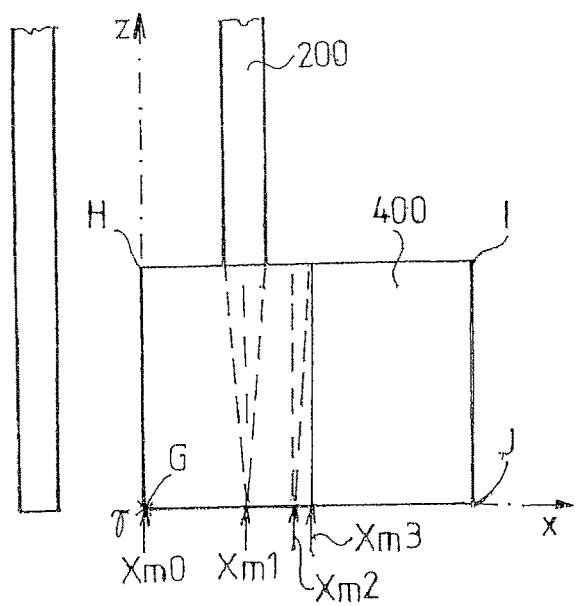
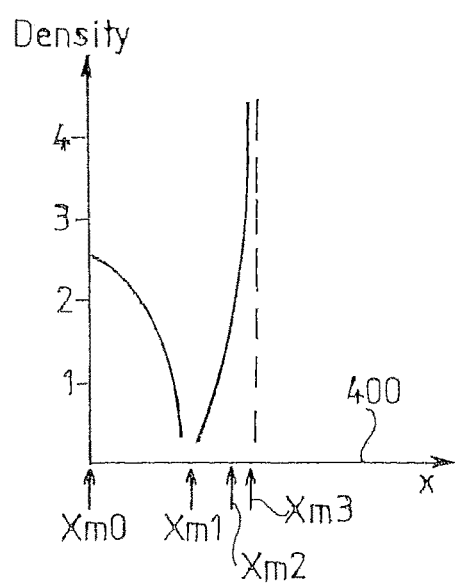
Fig. 2c
Fig. 2d
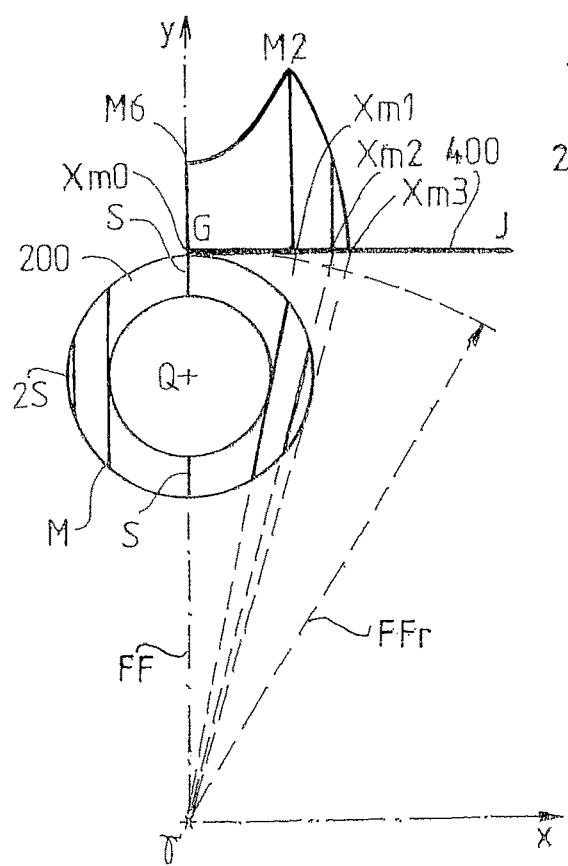
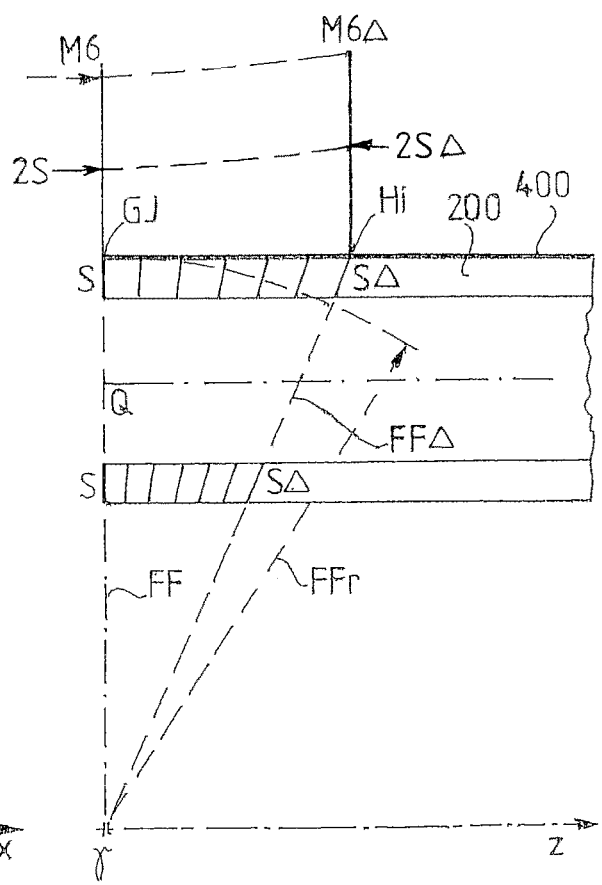
Fig. 2a
Fig. 2b

METHOD TO RADIOGRAPHICALLY DETERMINE GEOMETRICAL PARAMETERS AND/OR SUBSTANCE STATE OF AN OBJECT UNDER STUDY

CROSS REFERENCE TO RELATED APPLICATIONS

This patent application is the national phase of PCT/HU2017/050030 filed Jul. 27, 2017, which claims the benefit of Hungarian Patent Application No. P1600469 filed Jul. 27, 2016.

TECHNICAL FIELD

The present invention relates to a method by means of which an object can be displayed (for diagnostic purposes, e.g. structural inspections) in a radiation receiving device via the object being irradiated from a point of projection by radiation emitted by a—quasi—point-like radiation source serving as the source of radiation, particularly, of X- and/or gamma rays, wherein the object has well-defined geometrical and radiation physical characteristics, here e.g. X- and/or gamma ray absorption properties, and wherein the radiation receiving device (provided, in particular, as a film and/or any other suitable detecting means) shows, at a certain resolution, a change proportional to the amount of radiation incident onto and absorbed by the radiation receiving device in its pixels (i.e. in surface portions of a given size of the device) that actually represent the units of resolution used. Based on the change, i.e. by means of evaluating the change, geometrical parameters and/or the material state of the object under study may be determined.

BACKGROUND

In industry, ultrasonic or screening (radiographic) imaging techniques are used by choice for non-destructive inspection (corrosion/erosion) of various constructional parts, especially hollow objects, such as e.g. pipes, conduits, as well as weld seams thereof. In particular, in the field of e.g. (nuclear) power industry, ultrasonic wall thickness measurements are used to inspect (a) the pipe bends (especially, the outer bends), (b) the "T" members of the pipe connections and (c) the reducing/expanding pieces and further fitting elements in the case of pipes/conduits used in a power station.

Ultrasonic testings are impractical for the in-situ inspection of duplicated constructions (e.g. pipe-in-pipe structures) during operation of the plant, and optionally without removing heat insulation.

In the so-called radiographic tangential imaging technique (see below), which is known in the field of radiographic imaging, but not spread in practice, as a consequence of the nature of the radiation source used, empty pipes having a diameter of up to about 300 mm are imaged onto a film/detector, and then the wall-shadow of the pipe is assessed. The technique is applicable for pipes with a wall thickness of up to about 10 to 15 mm.

The industrial application of computer tomography (CT) is also known, however, in real industrial practice, i.e. not under laboratory conditions, CT is unaccomplishable. (Here, the relative position of the radiation source and the film/detector is fixed, but it is on the move relative to the object under study.)

It is of also importance that, in ultrasonic wall thickness measurements, the inspected material's surface is extremely small compared to a material's surface that can be displayed on a film/detector and inspected by radiography.

A radiographic tangential imaging technique, wherein reference elements are also imaged onto the film/detector simultaneously with the inspected object is also known. Thus, when the image is assessed, the image of one or more reference element is also available together with the image of the object. In such a case, thickness data of the inspected object can simply be derived in correlation with the images of the reference elements. Such a solution is disclosed e.g. in HU Patent No. 187,820 and EP Patent No. 128,922 B1 to determine the condition of pipes/conduits during operation of the plant.

The application of said reference elements makes a radiographic tangential imaging process more complicated, and will also largely reduce the area of the film/detector useful from the point of view of the imaging. Thus, in turn, it decreases the thickness of object that can be studied by the process.

The paper by A. Hecht et al. published electronically in NDT.net (see http://www.ndt.net/article/ecndt98/chemical/101/101.htm; October 1998, Vol. 3, No. 10) under the title "On-Line Radiographic Wallthickness-Measurement of Insulated Piping in the Chemical and Petrochemical Industry" teaches a radiographic tangential imaging method suitable for measuring the wall thickness of an industrial conduit which uses a flat surface electronic gamma- and/or X-ray detector to take the radiographic image of the conduit under study and a computerized digital data processing to evaluate the radiographs. Wall thickness of the conduit is determined on the basis of a projected digital image of the conduit wall, i.e. the "wall-shadow", by means of exploiting the geometrical relations characteristic of the geometrical arrangement that has been used to take the image. Accordingly, the method can only be used if the flat surface of the detector is capable of receiving/displaying a projected (and, hence, magnified, too) full image of the inspected conduit taken along the diameter of said conduit.

The paper by B. Redmer et al. published electronically in NDT.net (see http://www.ndt.net/article/ecndt02/308/308.htm; December 2002, Vol. 7, No. 12) under the title "Mechanised Weld Inspection by Tomographic Computer Aided Radiometry (TomoCAR)" discloses a method and a system for a computer assisted study of industrial conduits by radiometric scan, wherein a combined unit of a radiation source/detector is used that runs round the outer surface of the conduit under inspection line by line. Thickness of the wall is determined from the obtained digital data by means of laminographic and/or plain tomographic image reconstruction techniques. The method is rather complicated and, thus, expensive.

According to the prior art, the wall thickness measurement based on radiographic imaging is known, however, the pipe diameter to be handled by this technique—as discussed above—is rather limited. In this regard, the reader is referred to a contribution by *GE Sensing & Inspection Technologies* under the title "Computed Radiography Plus Rhythm Software Platform for FAC (Flow Accelerated Corrosion) Inspection in Nuclear Secondary Circuit" (for further details, see the conference proceedings of the 8th International Conference on NDE in Relation to Structural Integrity for Nuclear and Pressurized Components—We.3.B.3 held in Berlin, Germany between 29 Sep. and 1 Oct. 2010) as the most complete summary of the respective prior art.

Each—prior art—document cited above discloses a (tangential) projected-imaging film/detector arrangement to be used with pipes of about 220 to 250 mm in diameter and 15 mm in wall thickness, wherein the inspected pipes may also provided with heat insulation.

Moreover, each method discussed above performs measurements of the magnified projection of the wall thickness of the pipe under study appearing on the film/detector, naturally, through recalculating the extent of magnification. A solution combined with a reference calibration test piece also exists.

Nevertheless, the methods discussed have fundamental limitations since imaging the wall thickness of a conduit at the outer surface of said conduit results a material thickness of zero, while the largest material thickness that could be imaged at the inner surface cannot be displayed in most cases. This problem is illustrated in FIGS. 2d, 2c. Its core lies in the fact that in the methods according to the prior art, surely, the inner surface of the conduit is not located, in the concrete, at the position where it actually appears to be on the film/detector, but closer to the outer surface. Accordingly, the wall thickness determination is not accurate. As the pipe diameter and the wall thickness of the pipe increase, the problem gets even worse. Among other things, this is the reason for the methods disclosed above being not suitable to measure the wall thickness of a conduit of large diameter (greater than 250 mm in its outer diameter).

SUMMARY

Thus, the object of the present invention is to eliminate or at least to alleviate the problems arising in the respective prior art techniques, and in parallel with this, to provide an alternative non-destructive inspection technique based on radiography to determine the geometrical parameters and/or the material state of an hollow body, and preferably a tubular object to be inspected.

A further object of the present invention is to provide a non-destructive diagnostic technique based on radiography that can be used to inspect reliably, e.g. for diagnostic purposes, a conduit of an arbitrary outer diameter and wall thickness during or out of operation and, optionally, provided with an outer heat insulation layer as well. Apparently, hardness (energy) of the scanning radiation obtainable by the source of radiation used to prepare the projected radiographic image presents a fundamental limit to the largest measurable material thickness of the conduit wall.

A yet further object of the present invention is to provide such a non-destructive inspection method based on radiography, wherein to ensure evaluability of the measurement, there is no need to use a reference calibration test piece when the imaging is performed.

In case of the inventive solution, no reference calibration test pieces are required to determine the thickness/wall thickness parameter of an object, particularly a hollow body, and preferably a tubular object under inspection, and the detectable pipe diameter is not limited. Furthermore, the radiation receiving device used for the imaging can equally have a flat surface or an incurvated surface of cylindrical shell shape, as is shown in FIGS. 1a to 1d and FIGS. 6a, 6b. The inventive technique does not require imaging the wall thickness of the tubular object under study and, thus, recording the wall-shadow (however, the latter is possible). Instead, the method according to the present invention is to determine the so-called remarkable points of the tubular object in/on the object and the respective projected positions of said remarkable points on the radiation receiving device used for the imaging.

In industrial practice, the present invention is suitable for measuring wall thickness of mainly pipes, conduits and/or assessing (preferably corrosion/erosion) states thereof (e.g. deposits, wearing, etc.). Application of the invention also allows performing inspections in (nuclear) power plants, or in the oil and chemical industry during operation, i.e. in situ, and even when the conduit inspected is provided with a continuous insulation layer.

When the inventive method is performed, that is, in the period of time for image display, the radiation source, the object to be inspected and the radiation receiving device itself, i.e. the film, detector, or any other means suitable for image pickup/recording are all in a geometrically stable position relative to each other, or alternatively, any image defect due to the movement (e.g. vibration) thereof can be measured and thus eliminated.

In particular, a requisite for the non-destructive inspection method according to the invention is that the object to be inspected and arranged within the region irradiated by X- and/or gamma-rays, the device for receiving the radiation (that partially passes through the object), i.e. the film, detector, or any other means suitable for image pick-up/recording, and the radiation source itself have got geometrical and radiation physical parameters that can be expressed mathematically, and the object to be inspected, the radiation receiving device and the source of radiation are in a stable/non-moving position—within acceptable tolerance—for a period of time that is required to generate the radiograph, i.e. to create the image of the object by means of transillumination. Consequently, a line drawn from the source of radiation to any surface point of the radiation receiving device, i.e. the path of a given ray that passes through the object inspected can be interpreted from the point of view of dosimetry, and thus the intercept line passing through the object under inspection can be determined.

Basically, each of such intercept lines defines a single pixel on the radiation receiving device; here the term "pixel" refers to the smallest surface portion of the radiation receiving device that could be still observed as a separate surface element (that is, which carries information about the inspected object) at the highest possible resolution of the radiation receiving device. In particular, if the radiation receiving device is provided e.g. as a (traditional) X-ray film, a lower limit of the pixel dimension (i.e. the image resolution of industrial X-ray films) is about 0.05 mm on the minimum and, hence, the pixel size is 0.05 mm×0.05 mm; at the resolution of e.g. 0.1 mm, 100 pixels can be defined over 1 mm$^2$. That is, there are 12×10$^6$ (i.e. 12M) pixels present altogether on the surface of a film/detector with the size of 300×400 mm (120000 mm$^2$); each of these pixels can be evaluated separately, i.e. carries information. The pixel size is increased by unsharpness that is partially of geometrical origin (it results from the fact that the radiation source itself is not a point-like source, e.g. an Ir-192 source has the size of about 2.0 mm×3.0 mm), being present as external (geometrical) unsharpness, and partially originates from the unsharpness characteristic of the X-ray film itself (film unsharpness). Moreover, said unsharpness is also a function of the radiation energy that has primarily influence on the detectable value of the material thickness.

The extent of said film unsharpness depending on the radiation energy (and thus the type of radiation source) is summarized in Table 1 below.

TABLE 1

| | |
|---|---|
| 100 keV (X-rays) | 0.05 mm |
| 200 keV | 0.10 mm |

TABLE 1-continued

| 400 keV | 0.15 mm |
| Ir-192 (gamma) | 0.17 mm |
| Co-60 | 0.35 mm |
| 2 MeV (linear accelerator) | 0.32 mm |

Data given above do not mean that smaller values cannot be observed, detected in arrangements characterized by the given energy values. Rather, they should be considered as representing characteristic values for the image resolution. As image quality indicators, for objects—of e.g. tubular shape—to be inspected, the so-called wire type IQI ("Image Quality Indicator") calibration test piece is suggested (for further details the reader is referred to the professional booklet edited and published by Agfa-Gevaert N.V. under the title "Industrial radiography") as this interferes with the image to the least extent. The IQI calibration test piece is a calibration test piece consisting of wires of various diameters arranged in accordance with standard order. When tubes are welded, said wires are, in general, placed in positions at right angle to the weld seam. However, in radiographic inspections, this arrangement is not applicable as for tubes with smaller diameter, a wire of the IQI calibration test piece lies on an intercept that goes through material changing in thickness and, thus, it may adversely influence the evaluation scheme used to determine the wall thickness. Hence, it is better if the calibration test piece is arranged at the nominal material thickness in parallel with the weld seam.

It is preferred if the wire diameter expectable in accordance with visibility is expressed as a percentage (%) of the nominal material thickness. Based on experience, if image enhancing devices used in the evaluation of radiographs, i.e. filtering means used to diminish the effects of scattered radiation are applied, this value may be 1.0%. According to the state of the art, the value of 0.5% is still possible.

In radiographic investigations, a yet further important feature is the contrast of the image, the relation of which with blackening ("density") is summarized in Table 2 below.

TABLE 2

| density | contrast |
| --- | --- |
| 3.0 | 100% |
| 2.5 | 85% |
| 2.0 | 71% |
| 1.5 | 54% |
| 1.0 | 35% |

Based on experience, dose ($\approx$density) range of a film/detector to be used as the radiation receiving device can be evaluated within the range of 0.5 to 4.5, wherein the dose ratio is defined as the logarithm to base 10 of the ratio of the reference dose and the measured dose. In case of films, there exists a so-called blue-base (noise range of the evaluation) at the density of 0.2 to 0.25, this range can be avoided by means of using a slight margin.

Two types of single use film are recommended as radiation receiving device: the films with lead (Pb) intensification prepared and sold by the firms Agfa-Gevaert and Fuji (Japan). Table 3 below summarizes how the two different types of film can be made correspondent to each other.

TABLE 3

| Agfa | Pb | Fuji | Pb |
| --- | --- | --- | --- |
| D4 = | | 50 | |

TABLE 3-continued

| D5 = | 80 |
| D7 = | 100 |
| D8 = | 150 |

For larger material thicknesses, only radiation sources emitting gamma-rays are applicable. For example, for an Ir-192 source, the largest material thickness that can be transilluminated is about 4 inches (101.60 mm), which means that no X-rays at all are applicable at this and larger material thicknesses. For a Co-60 source ($\approx$1.25 MeV), the detectable largest material thickness will be 8 inches (203.20 mm). For some elements, the most important material parameters—calculated at the energy of 1.0 MeV—are summarized in Table 4 below; here, in Table 4, column (I) contains the symbol and the atomic number of the respective element, column (II) contains the density $\rho$ (by volume) of the element, columns (III) and (IV) contain the total attenuation coefficient $\mu$ and the linear attenuation coefficient $\mu^*\rho$, column (V) is the absorption half-value thickness (HVT) of the respective element expressed in units of cm (here, the relation ln $2=0.69315/\mu^*\rho$ holds), while column (VI) contains the surface density of the respective element expressed in units of g/cm$^2$.

TABLE 4

| I | II | III | IV | V | VI |
| --- | --- | --- | --- | --- | --- |
| 13 Al | 2.70 | 0.06143 | 0.16586 | 4.1791 | 11.2836 |
| 14 Si | 2.34 | 0.06354 | 0.14868 | 4.6620 | 10.9091 |
| 22 Ti | 4.50 | 0.05875 | 0.26437 | 2.6219 | 11.7985 |
| 23 V | 6.10 | 0.05779 | 0.35252 | 1.9663 | 11.9942 |
| 24 Cr | 7.10 | 0.05912 | 0.41975 | 1.6513 | 11.7245 |
| 25 Mn | 7.40 | 0.05833 | 0.43164 | 1.6058 | 11.8833 |
| 26 Fe | 7.87 | 0.05975 | 0.46354 | 1.4953 | 11.7683 |
| 27 Co | 8.90 | 0.05890 | 0.52421 | 1.3223 | 11.7682 |
| 28 Ni | 8.90 | 0.06140 | 0.54646 | 1.2684 | 11.2891 |
| 29 Cu | 8.96 | 0.05881 | 0.52694 | 1.3154 | 11.7862 |
| 41 Nb | 8.57 | 0.05834 | 0.49997 | 1.3864 | 11.8813 |
| 42 Mo | 10.22 | 0.05809 | 0.59368 | 1.1675 | 11.9323 |
| 74 W | 19.30 | 0.06488 | 1.25218 | 0.5535 | 10.6836 |
| 82 Pb | 11.35 | 0.06971 | 0.79121 | 0.8760 | 9.9433 |
| water: | 1.00 | 0.07060 | 0.07060 | 9.8180 | 9.8180 |

It should be here noted that iron (Fe) actually stands for simple unalloyed carbon steels, while in industry in most cases alloyed steels are used; hence, the value of half-value thickness HVT has to be always checked. The above table shows possible alloying elements of steel, but element 82Pb. Table 4 is based on the document Health Physics Resources—UCRL-501741: Compilation of X-Ray Cross Sections.

Knowledge and applications of the state of the art form indispensable parts of the method according to the invention. Radiography is part of non-destructing material testing (NDT). Therefore, international regulations and standards apply for the image analysis and evaluation. In this respect, the basic European standards are ISO 14096-1:2005(EN) and ISO 14096-2:2005(EN). Consequently, for films, for the time being, the apparatuses GE film digitizer FS50 and FS50B can (only) be offered. Some characteristic features of digitizer FS50B are as follow: maximum width of the analysed film may be 355 mm (14 inches); the minimum resolution is 0.05 mm, that is, the smallest pixel is of the size 0.05 mm×0.05 mm; here, the density range is 0.05 to 4.7 D; density contrast sensibility: 0.02.

For diagnostic purposes, in case of e.g. an Ir-192 radiation source, the expected minimum pixel size is 0.1 mm×0.1 mm; however, in case of a Co-60 radiation source, a pixel size of 0.2 mm×0.2 mm is already acceptable/allowable.

It should be here also noted that, for diagnostic purposes (such as e.g. the inspection of weld seams), films D4, D5 in Table 3 can be considered to be suitable, however, for tube wall thickness measurements, that forms a possible aspect of the invention, film D8 is sufficient (in case of e.g. an Ir-192 radiation source, the exposure time of film D8 compared to that of film D5 is about 30%). It is also noted here that wall thickness measurements of pipes and conduits are performed nowadays by ultrasonic testing. In light of this, we presume that a pixel size of 0.25 mm×0.25 mm or 0.20 mm×0.20 mm is perfectly suitable for the wall thickness measurements of pipes and conduits. These data also take into account the geometrical unsharpness that arises due to the dimension and shape of the radiation source. If the above criteria are accepted, X-ray films can be replaced by a "flat panel" of the type DXR-250C-W and/or DXR25U-W (manufacturer: General Electric, Inc., USA) when the inventive method is performed. (Here, there is only a size difference present between the two types of panel, that is, the panel denoted by C is 8" by 8" in size, while the other one denoted by U is 16" by 16" in size.) As said apparatuses are also GE products, they can be operated with the software platform of digitizer FS50B. Moreover, the detectors in the panels are flat surface detectors and are not bendable, the detecting substance therein is gadolinium oxy-sulphide (GOS), and the pixel size is 0.2 mm×0.2 mm.

It is clear that these detectors are not suitable for diagnostic purposes, however, within the framework of the present invention they can be used to replace traditional films as the radiation receiving device. The exposure time of GOS detectors is commensurate to that of so-called RCF films, which is about 20% to 30% of the exposure time of film D8 cited above.

If it is taken into account that a blackening of smaller extent (2.0 or even a yet smaller value instead of 2.5) is enough to perform wall thickness measurements, the exposure times required to take the individual tangential radiographs can be decreased. As far as the films are concerned, so-called "phosphor" films—wherein $AgBr_2$ is substituted with phosphorous compounds—would be highly preferred in this regard, however, they are incompatible with the digitizer FS50B.

For example, in case of an active insulated steam conduit in operation having a tube diameter of 465 mm, with insulation 770 mm, and having a tube wall thickness of 16 mm, assuming an operation temperature of 270° C. and a steam pressure of 46 bar, the total dosimetry wall thickness will be 40 mm (total tube wall thickness is 32 mm+contribution of heat insulation material is 1 mm+iron-equivalent wall thickness of steam is 7 mm). At focus-to-film distance of 770 mm with the application of an Ir-192 radiation source, the activity of which is 850 GBq, the exposure time required to achieve a density of 2.5 for the various radiation receiving devices changes as follows:

film Fuji 80+Pb: exposure time is 50 min;
film D8: exposure time is 15 min;
film RCF: exposure time is 5 min.

Under the same conditions, but requiring a density of 2.0, the exposure time decreases further, e.g. it will be 12 min and 4 min for the films D8 and RCF, respectively. In case of a flat panel, the exposure time can even be shorter.

In the above exemplary inspection, the following problem arises: in case of an "empty" conduit, the exposure would take place for a double wall thickness (2S=32.0 mm). If this was imaged to a film, based on the geometrical data of the steam conduit, the material thickness corresponding to 2S would be located in the conduit wall at a distance of 0.56 mm from the outer surface towards the inside of the conduit. The greatest material thickness (that is, 167.8 mm) appears at the intercept that belongs to the inner surface of the conduit wall, said greatest material thickness attenuates the dose of irradiation by a rate of about 1/10000, and thus—as is shown in FIGS. 2c and 2d—it results in a broad bright band over the film/detector. As a consequence, it is rather difficult to determine the intercept belonging to the inner surface. For an inspection to be performed in the operating state of the conduit (i.e. there is steam in the conduit), the situation would be much worse.

BRIEF DESCRIPTION OF THE DRAWINGS

The invention is now explained in more detail with reference to the accompanying drawings, wherein FIGS. 1a, 1b, 1c and 1d illustrate the arrangement of a tube to be inspected and a radiation receiving device, preferably a film, in case of a radiation receiving device with flat surface (FIGS. 1a and 1b; tangential radiographic imaging) and in case of a radiation receiving device that follows the curvature of the tube shell (FIGS. 1c and 1d), without an insulation coating (FIGS. 1a and 1c) and with a continuous insulation coating (FIGS. 1a and 1d);

FIGS. 2a, 2b, 2c and 2d are a cross sectional view of the arrangement shown in FIG. 1a with an intercept curve, a longitudinal sectional view of the arrangement shown in FIG. 1a with the plane of intercept, a top sectional view of the arrangement shown in FIG. 1a with the film, and the characteristic curve (or film density) obtained by evaluating the exposed film that corresponds to the intercept curve shown in FIG. 1a, respectively;

DETAILED DESCRIPTION

Figure 3:
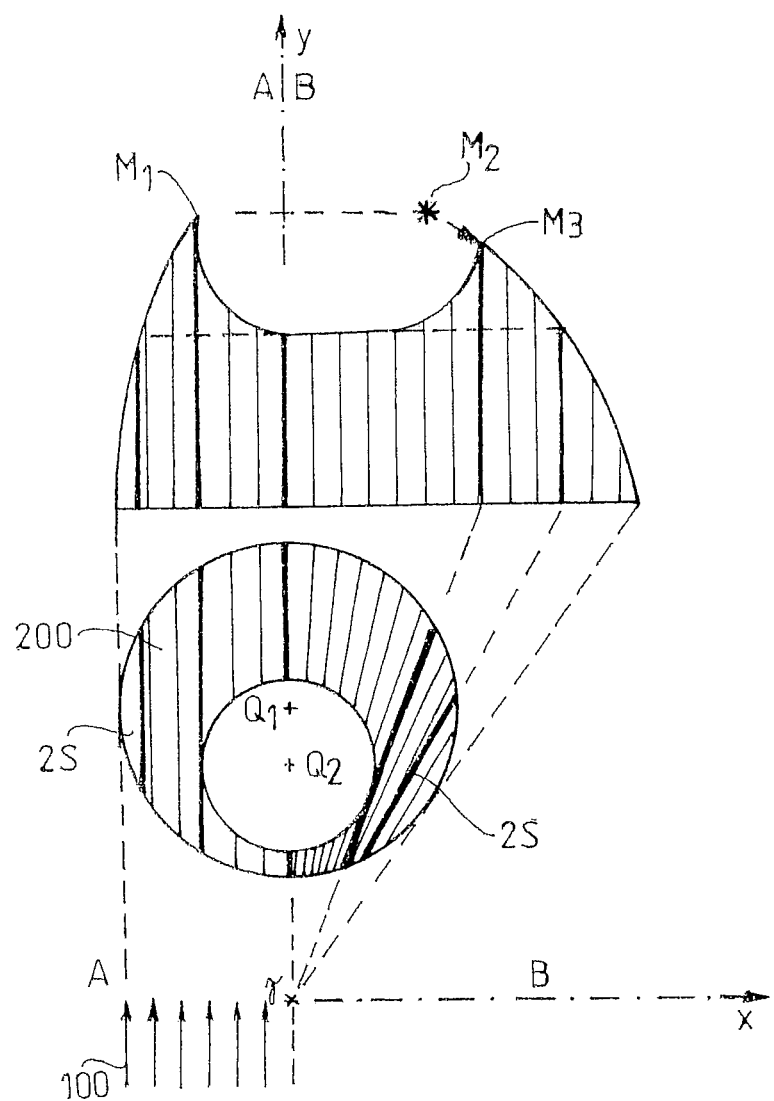
FIG. 3 represents a dedicated case, wherein the inner diameter of the tube and the outer diameter of the tube go through different centres, that is, the tube under inspection is an eccentric tube and, hence, the tube wall thickness is not uniform in sections taken perpendicular to the longitudinal axis of the tube.
Figure 4:
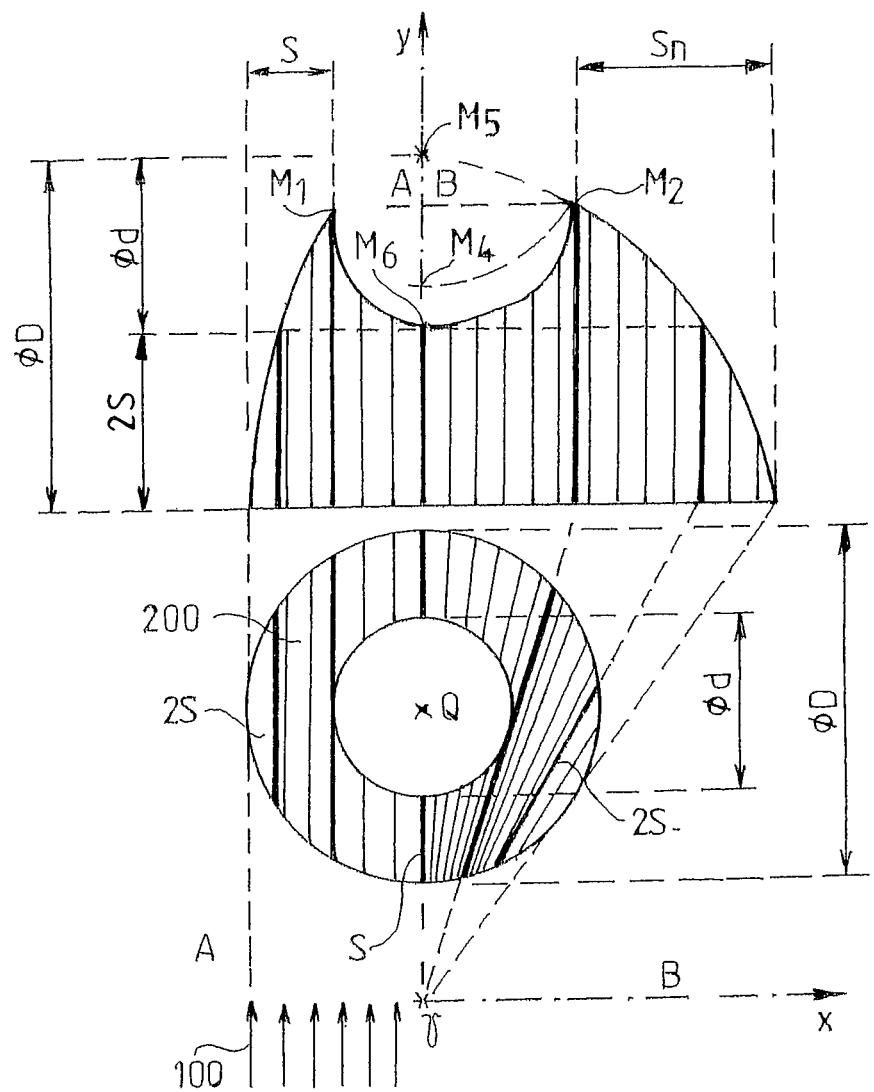
FIG. 4 illustrates the basis of the inventive technique.

Tubes illustrated in FIGS. 1, 2 and 5 are of identical size; furthermore, tubes shown in FIGS. 3, 4 and 6 are of also identical size. The drawings are approximately scaled drawings. Referring now to FIGS. 1 to 6, reference signals used in the drawings are explained in what follows. In the drawings:

100 radiation used for imaging (X- and/or γ-radiation)
200 tube
300 insulation layer

400 radiation receiving device (in particular, any of a film, a detector, an imaging device) sensitive to radiation used for imaging
γ source of radiation or, alternatively, point of projection
F*F=FF distance between the radiation receiving device and the source of radiation, reference distance for the exposure
FFΔ actual distance between the radiation receiving device and the source of radiation
FFr distance between the radiation receiving device and the source of radiation measured from the point of projection along a given direction
A intercepts belonging to the tube 200 in parallel projection
B intercepts belonging to the tube 200 when projected from a projection point corresponding to the source γ of radiation
Q (general) centre of the tube 200
Q1, Q2 centres of an eccentric tube 200 (see FIG. 3)
S (general) wall thickness of the tube 200
Sn magnified projection image of the wall thickness S on the radiation receiving device 400 in harmony with FIG. 4
SΔ intercept belonging to the wall thickness S
2S (general) intercept belonging to the twice of the wall thickness S of the tube 200
M1 longest intercept belonging to the tube in parallel projection
M2 longest intercept belonging to the tube when projected from a projection point that corresponds to the source γ of radiation
M3 longest intercept belonging to the tube with centres Q1, Q2 when projected from a projection point that corresponds to the source γ of radiation
M4 (general) the tube 200 contains a filling substance (e.g. water, steam, etc.)
M5 (general) the tube is a full tube, i.e. it forms a bar, cylinder; its diameter D is shown in FIG. 4
M6 diameter d of a hollow tube as shown in FIG. 4, the relation ØD−Ød=2S holds
x, y, z axes of reference
Xm0, Xm1 projections of the intercepts belonging to the tube 200 along axis x of a flat surface radiation receiving device 400 in harmony with FIG. 2
Xm2, Xm3 projections of the intercepts belonging to the tube 200 along axis x of a flat surface radiation receiving device 400 in harmony with FIG. 2
G, H, I, J four corners of the radiation receiving device 400
GH; JI sections parallel with axis z
GJ; HI sections parallel with axis x
C defect (e.g. a void) within the wall of the tube 200 as shown in FIG. 5
Cn magnified projected image of defect C on the radiation receiving device 400 as illustrated in FIG. 5
MX (general) material thickness obtained from an intercept In what follows, we explain in brief how the material thickness MX can be obtained from the nominal exposure data.

Knowing the density (characteristic) curve of the radiation receiving device 400—for the sake of simplicity, from now on, the film/detector—it can be accepted that density of the film/detector is proportional to the dose of irradiation (DF), and the relation $$\log_{10} \frac{\text{intensity of incident radiation}}{\text{intensity of transmitted radiation}} = \quad (1)$$

$$D(\text{ensity})/\text{blackening} \sim \text{dose}(DF)$$

holds on the basis of the applied parameters.

Each term in the base equation for exposure can be determined separately, for example it holds that $$t = \frac{DF * l^2 * 2^{MX/HVT}}{A_{Bq} * K_\gamma} * 3.6 * 10^9, \quad (2)$$

wherein
t=exposure time (in units of second),
DF=dose (in units of Sv),
l=(focus-to-pixel) distance (in units of meter),
HVT=half-value thickness (in units of meter),
$A_{Bq}$=activity (in units of Bq),
$K_\gamma$=dose coefficient (mSv·m²/GBq·h)
MX=material thickness belonging to the intercept.

From equation (2), after its transposal, one obtains that $$DF = \frac{A_{Bq} * K_\gamma * t}{l^2 * 2^{MX/HVT}} / 3.6 * 10^9, \quad (3)$$

or $$2^{MX/HVT} = \frac{A_{Bq} * K_\gamma * t}{l^2 * DF} / 3.6 * 10^9. \quad (4)$$

Now, if the right side of equation (3) is denoted by C, one obtains the relation of $$2^{MX/HVT} = C, \quad (5)$$

from which $$MX/HVT * lg2 = lgC, \quad (6)$$

$$HVT = MX/lg2 * lgC. \quad (7)$$

Using the latter, the intercept in the material can be expressed as $$MX = HVT * lgC/lg2. \quad (8)$$

The traditional interpretation is shown in FIG. 4: intercepts in hemi-space A and hemi-space B can be easily compared (here, the term "intercept" refers to the distribution of material between the source γ of radiation and a pixel point obtained by the tangential radiographic imaging performed with the source γ of radiation). FIG. 4 shows the positions of the remarkable intercepts, i.e. 2S, M1, M2, all the intercepts are located in the XY plane. Essentially, the envelope of the intercept lines, or rather the so-called intercept curve, is uniquely defined by the position of the point of projection (source γ of radiation). This situation is considered to be ideal. The situation illustrated in FIG. 3 differs significantly from said ideal situation. FIG. 3 shows the inventive concept that allows us to clearly reveal the problem of a (n eccentric) tube 200 with two centres Q1, Q2 from the point of view of radiography by means of performing an analysis of the intercept curve. It is of importance here, that while the intercept curves within hemi-space A of FIG. 3 and of FIG. 4 are identical to each other, the intercept curves within hemi-space B of FIG. 3 and of FIG. 4 differ from each other to a measurable extent; see the position of M2 in comparison with that of M3. In practice, this means that although the wall thickness S of the tube seems to be the same over the film 400 in case of an image taken by e.g. tangential radiography, the analysis of the intercept curves in the two hemi-spaces clearly indicates every difference. If the centre Q2 is located closer to the source γ of radiation in FIG. 3, the peak of intercept curve M3—compared to that of intercept curve M2—moves toward a smaller value along axis y (from now on, decreases), while it moves toward a higher value along axis x (from now on, increases).

If the position of centre Q2 increases along axis y, the peak of intercept curve M3 belonging to the tube increases along axis y and decreases along axis x. Continuing with this train of thought, now FIGS. 2a to 2d are explained in more detail with reference to the tube/film arrangement illustrated in FIG. 1a. The film 400 lies in plane ZX, in parallel with axes z and x. Remarkable intercepts belonging to the tube are represented by Xm0, Xm1, Xm2 and Xm3, that are located on section GJ of the film 400 in plane YX; here the source γ of radiation is the origin of the YXZ frame of reference, wherein Xm0—in harmony with FIGS. 2a and 2c—is the projection of the intercept belonging to material thickness 2S along the line running from the source γ of radiation to the point G of the film/detector 400. Here, Xm1 is the longest intercept M (taken at the inner cylindrical surface of the tube wall where radiation travels the longest distance within the tube wall), Xm2 represents an intercept extending in the tube wall at an intermediate location, and Xm3 is a projection of the outer cylindrical surface of the tube wall (i.e. at zero material thickness). Furthermore, section Xm1-Xm3 corresponds to the magnified projection image Sn of the wall thickness S of the tube wall.

Distance FF is directed into point G of the film; this is the only point, wherein the source of radiation to film distance is equal to the distance FF and the theoretical values given for the nominal, i.e. 2S, material thickness actually hold. It is of importance that any imaged point over the film can be appointed and identified geometrically, wherein the FFΔ (see above) and the respective intercept can be determined. Hence, this can be considered as a reference line, to which known nominal parameters of the object (in particular, the tube) under inspection can be assigned, such as the tube diameter, wall thickness, filling substance, insulation, etc., as well as respective data of the film/detector and the required radiation physical parameters. With a knowledge of these pieces of information, dose/density data of the film can also be determined, and/or the data allow calculating the material characteristics as well. FIG. 2a shows where the intercept belonging to material thickness 2S holds on the film (i.e. at Xm0 and Xm2), however, the densities (doses of irradiation) over the film are not congruent with these. An explanation for this is that according to FIG. 2 FFΔ>FF, and the dose of irradiation is inversely proportional to the square of the thus increased distance; hence, the density value belonging to Xm0 appears to be not at projection point Xm2, but at an intercept belonging to a smaller material thickness; that is, said density value gets closer to the outer surface of the tube wall.

FIG. 2c is a top view of FIG. 2a; according to FIG. 2c, due to the exposure of point G on the film, the image projections Xm1, Xm2, Xm3 represent—as a consequence of a decrease in dose—a spreading and fading band (decreasing in density) when moving away from point G.

FIG. 2d shows the characteristic curve of section GJ of the film exposed from the source γ of radiation in the direction of point G, wherein the (reference) exposure calculated for point G is set to 2.5. It can be seen from FIG. 2d that the projection of Xm1 onto axis x is a discontinuous curve at the vicinity of the blue-base, and—as it has been previously noted—the remarkable points of said characteristic curve do not coincide with those of the intercept curves. (This is the reason for the fact that prior art methods discussed above do not function above a tube diameter of about ØD=300 mm and the tube wall thickness of about S=15.0 mm.

FIG. 2b is a side view of FIG. 2a, i.e. the exposed tube/film arrangement used in the method according to the invention. FIG. 2b illustrates that in case of e.g. the tube wall thickness of S=50.0 mm, at section HI SΔ=54.4 mm holds, and if the distance between the film and the source γ of radiation is FF=700 mm, then the actual distance between the film and the source γ of radiation at point H on the film will be FFΔ=761.6 mm; FIG. 2b also shows the change of each of the respective intercepts M6, M6Δ and M; here FF=FFr holds.

The core of the evaluation method according to the invention is that, in its starting step, nominal parameters of the tube/pipe/conduit to be inspected (such as the tube diameter, wall thickness, type of insulation, type of filling, i.e. substance present in the tube), as well as nominal parameters of the source of radiation and nominal parameters and geometrical positions of the radiation receiving device, called together as the nominal—i.e. known—parameters of the radiographic arrangement are fed, as initial parameters and in the form of input data, into a unit (in particular, a computer, or microcontroller, etc. equipped with a processor, a memory and a storage pool needed to complete the calculations) that performs on-line or off-line processing/evaluation of the tangential radiograph to be taken in subsequent steps of the method in order that said unit could construct/compute the actual spatial configuration of the source of radiation, the hollow object inspected, i.e. specifically a tube, and the device receiving the imaging radiation emitted by the source of radiation, or rather the intercepts to be expected in each individual given pixel (or piece) of the radiation receiving device (film/detector) for the nominal parameters of the radiographic setup, the radiation doses that can be assigned to the projection image of said intercepts of the paths of radiation passing through material, as well as the density values. Here (a) for an empty tube, the reference material thickness is equal to the nominal wall thickness 2S that belongs to the distance FF at the exposure; this is the reference thickness, independently of the extent of variation in the material thickness. Thus, said reference thickness is assigned to each pixel of the film/detector that is required for the inspection. Intercepts passing through material derivable on the basis of the nominal exposure data, as well as doses of irradiation and density values corresponding to the projection images of said intercepts, calculated on the basis of relations (1) to (8), are also assigned to said pixels. The values can be recalculated for the intercepts passing through material belonging to the individual pixels without limitation on the tube diameter and the wall thickness.

(b) for a tube in operation, which thus contains a filling substance (e.g. water, steam, etc.), the filling substance can also be assigned to the material thickness corresponding to the individual pixels; here the combination of the tube material and the filling substance shall be considered. It is preferred if half-value thickness (HVT) of the filling substance is known, because then the doses of irradiation and the density values corresponding to the filling substance can be subtracted from the doses of irradiation and the density values corresponding to the pixels concerned. Actually, an exposure material thickness has to be given for the filling substance as well—this value will increase the nominal exposure material thickness of an empty tube (e.g. in case of the aforementioned steam conduit). Any coating arranged around the tube, as well as any further substance present between the outer surface of the tube (or of the coating, if present) and the source of radiation and/or the radiation receiving device, e.g. air, can/should be similarly taken into consideration. In this way a secondary radiographic image is obtained that also takes into account the presence of a filling substance, coating, and further substances. Now, this secondary radiographic image will serve as a basis for calculating the intercepts passing through material belonging to the individual pixels. It should be here noted that if the half-value thickness of the filling substance is not available, said value can be determined by means of interpolation using at least two test radiographs taken in a manner know to a skilled person in the art.

Then, a radiographic tangential imaging of the tube is performed onto the film/detector to obtain the radiograph thereof, the evaluation of which is explained below with reference to FIGS. 2a and 2b; herein FIGS. 2c and 2d are needed to interpret the results.

If the film/detector 400 of FIG. 2a is read out (e.g. digitized) over its section GJ in a band (or slice) that has a pixel width of the digitally available resolution (chosen to be 0.20 to 0.25 mm in this case), the intercept curve shown in FIG. 2a is obtained (see above the film, in the Figure). The obtained intercept curve lies in the plane YX, and is perpendicular to axis z which is the axis of the tube inspected. Then, starting from and continuing along said section GJ in parallel bands (slices) having the width of the resolution one after the other until the last band corresponding to section HI is reached, the whole film/detector 400 is read and mapped into intercept curves, each of which belongs to a single pixel (piece) of said film/detector 400. The intercept planes obtained by the mapping—in harmony with FIG. 2b—will incline towards axis z with a given angle, and the intercept lines become larger in proportion with the angle of the inclination (M6<M6Δ holds).

If density of the reference (nominal) exposure is set to 2.5, the density values over the whole film/detector area will provide the essential fundamental pieces of information to determine the material state of the tube under inspection.

Figures 6A, 6B:
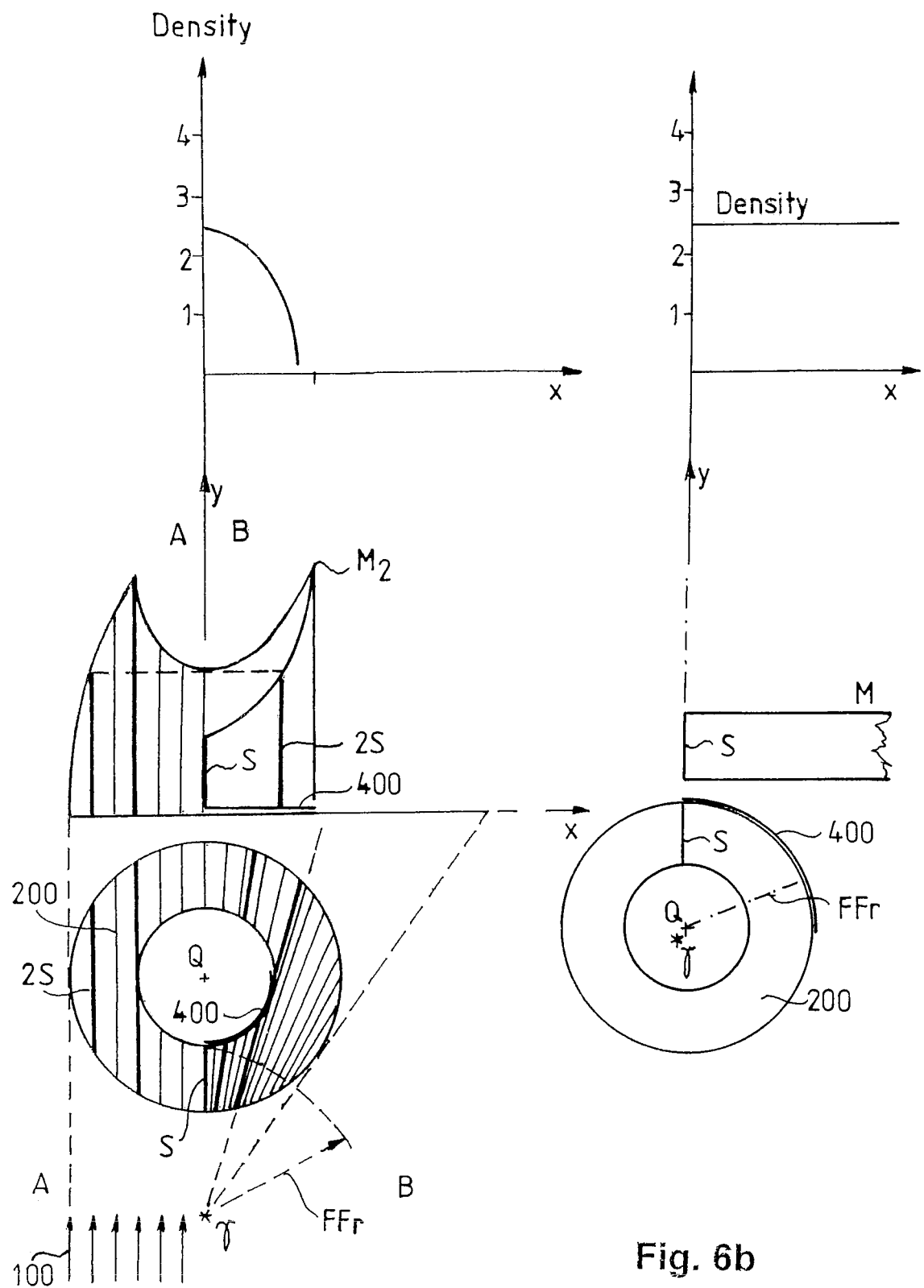
FIGS. 6a and 6b illustrate traditional film/radiation source arrangements used in nowadays practice for inspections in non-operating states with a film arranged on the inner cylindrical surface and the outer cylindrical surface, respectively, of a tube; it is important, that in this case radiation travels through a material of only a single wall thickness.

Naturally, reading-out the film/detector can be started at section GH and continued towards section JI as well; in this case straight intercept lines are obtainable. The obtained intercept planes are parallel to axis z, and incline towards axis x in plane YZ. A variant of said straight intercept lines is shown in FIG. 6b. The advantage of a straight intercept line is that it represents a side sectional intercept of the tube inspected, while an intercept curve is a front view intercept of the tube; projected, naturally, to axis z and axis x. An advantageous feature of said intercept curves and straight intercept lines is that if they are ideal, i.e. they do not indicate a defect, and there is no need to take any further measures in the inspection. (Moreover, in such a case, it is enough to take radiographs only for half of the periphery of the inspected tube.) The intercept curve can be interpreted even though the (magnified) projection (i.e. the wall-shadow) of the wall thickness S cannot be displayed on the film/detector for any reason, and/or the wall diameter OD is larger than the dimension of the film/detector itself.

Figure 5C:
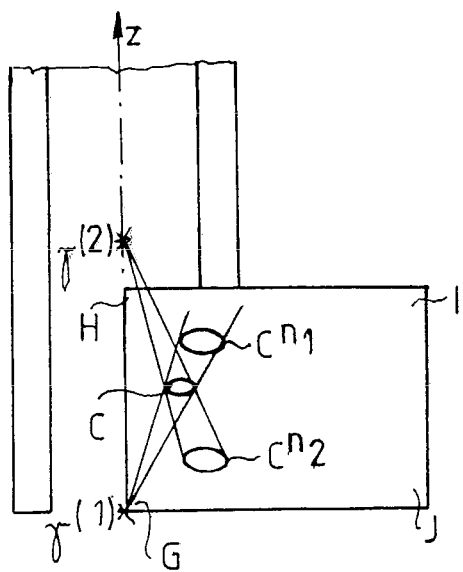
FIGS. 5a, 5b and 5c show in the cross sectional, longitudinal sectional and top sectional views, respectively, of the tube how to interpret a defect (e.g. a void) in the tube wall and to determine its location; and finally
Figure 5A:
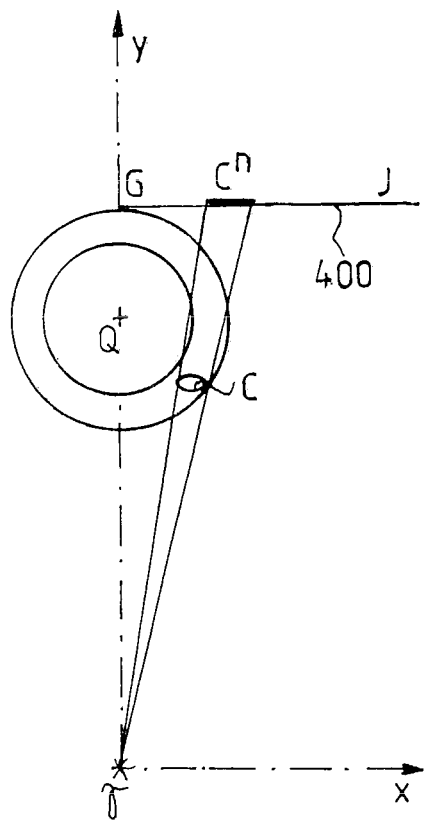
Figure 5B:
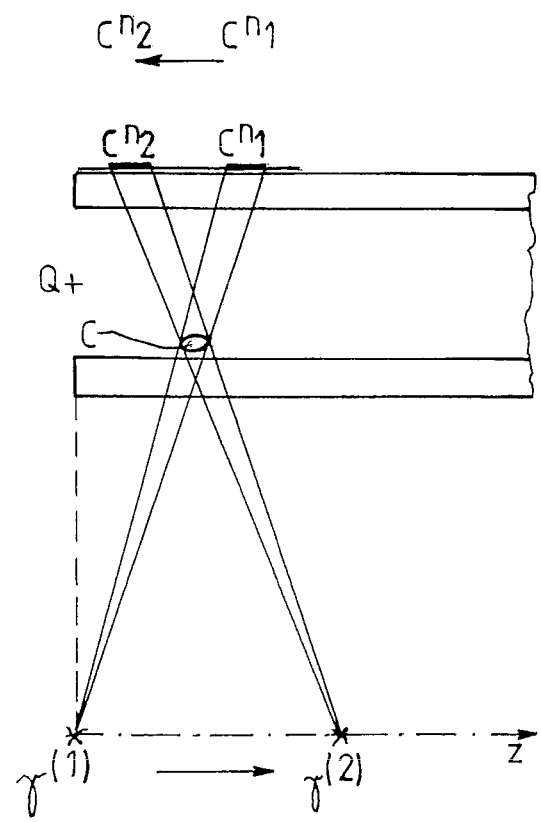

In case of a defect, according to FIGS. 5a to 5c, locating the defect C in the tube wall takes place as follows: for a "flat panel" device, the radiograph taken can be displayed on the display of digitizer FS50B immediately; here, the nominal parameters needed to evaluate a radiograph are also fed into said digitizer. (Digitizer FS50B can be installed anywhere, it is not required that the digitizer is located on the spot of the inspection.) After performing the imaging with the source γ of radiation in a first position thereof, the imaging is repeated (the previous, first, radiograph displayed on the "flat panel" can simply be saved into the digitizer FS50B, i.e. into its storage device, e.g. memory unit) in such a way that said "flat panel" device is kept in its original unchanged position, while said source γ of radiation is displaced—in parallel with e.g. axis z—into a second position. Said second position of the source γ of radiation is chosen in such a way that a magnified projection image Cn of said defect is also visible in the second radiograph. Then, the respective radiation source and the associated magnified projected image of defect C in each of the radiographs are joined by a straight line; now, the intersection of the two lines defines the geometrical position of the defect within the tube (i.e. in the wall of a hollow object inspected). As the source of radiation, the tube, the film/detector and the position of the defect can be constructed in 3D space, the extent of magnification of defect C can be calculated, too. If the imaging takes place onto a film,—in principle—everything remains the same, although in such a case the film is replaced between taking the two radiographs and the two imaging steps are performed with each a respective film. Measured material thickness MX corresponding to an intersect that differs from the intersect that belongs to the nominal values indicates a defect. If the material thickness MX that can be calculated from the characteristic curve of the film/detector obtained from the radiograph exposed onto the film/detector differs from the latter, again, a defect is present.

Software solutions corresponding to the techniques of present prior art are available for said digitizer FS50B. However, the method according to the present invention, as well as application of the relations defined by equations (1) to (8) as part of the method have to be implemented to/programmed into digitizer FS50B; this, however, is a routine task for a skilled person in the art. In particular, data of the sources of radiation and films/detectors practically used should be stored in the storage unit of the digitizer apparatus. Apparently, in practical variants of the technique according to the present invention, the relative position and the distance of the source of radiation and any of the pixels of the film/detector can be determined unambiguously. Moreover, it is highly preferred that the images taken in—traditional-weld seam inspection methods can be subjected to wall thickness measurements to be performed in accordance with the present invention in an automated manner and with the requisite of no further special initial procedures.

It should also be here noted that in case of imaging onto film, a pen-type densitometer can also be used in simpler cases, as each pixel on the film can be separately determined; such a pen-type densitometer is suitable for measuring only a single pixel and, thus, by means of Table 2, approximate data can be derived.

The invention claimed is:

1. A method to determine geometrical parameters and/or a material state of an object (200) to be inspected by an in-situ taken radiographic image of the object (200), said object (200) having geometrical and radiation physical parameters that can be described mathematically in a radiographic arrangement with known nominal parameters of the object (200), a source (γ) of radiation, and a radiation receiving device (400), the method comprising:
   irradiating the object (200) to be inspected by an imaging radiation (100) emitted by said source (γ) of radiation, receiving radiation passing through said object (200) by said radiation receiving device (400), displaying the object (200) to be inspected by said radiation receiving device (400) as a radiographic image formed by a change in the radiation receiving device (400) being essentially proportional to an amount of radiation absorbed by said radiation receiving device (400), maintaining the source (γ) of radiation, the object (200) to be inspected and the radiation receiving device (400)—within acceptable tolerance—in a mutually fixed geometrical position for a period of time that is required to take and/or detect the radiographic image, dividing the thus obtained radiographic image into slices extending in parallel to one another from one edge of said image to an opposite edge thereof, wherein a width of the slices being defined by a pixel width available at a possible largest resolution of the radiation receiving device (400), then dividing individual ones of the thus obtained image slices into pieces along each respective image slice by the pixel width available at the possible largest resolution of the radiation receiving device (400), assigning then a numerical value and an intercept to individual pieces thus obtained, wherein said value represents the change in the radiation receiving device (400) due to the amount of radiation absorbed in the respective piece, and wherein said intercept extends from the source (γ) of radiation to the respective piece of the image along a straight line through the object (200), changing the value thus obtained for the respective piece by a nominal value representing the change in the radiation receiving device (400) due to the amount of radiation absorbed in the respective piece to create a changed value for individual ones of the respective pieces, wherein said nominal value is derived based on the nominal parameters of said radiographic arrangement before performing imaging the object (200) in a previous calibration process, creating thereby a secondary radiographic image of the object (200) using the changed values, and then calculating the geometrical parameters and/or material state of the object (200) by making use of the thus obtained secondary radiographic image on a piece by piece basis for each intercept belonging to the respective piece.

2. The method according to claim 1, wherein said radiation receiving device (400) is provided by any of a film, a detector and an image recording means sensitive to the imaging radiation.

3. The method according to claim 1, wherein the object (200) to be inspected is a tubular object having a wall thickness, and to take the radiographic image, the radiation receiving device (400) is arranged in a flat planar position.

4. The method according to claim 1, wherein the object (200) to be inspected is a tubular object having a wall thickness and defined by an inner cylindrical surface and an outer cylindrical surface, and to take the radiographic image, the radiation receiving device (400) bears against either the outer cylindrical surface or the inner cylindrical surface of the tubular object.

5. The method according to claim 1, wherein the object (200) to be inspected is a tubular object having a wall thickness and defined by an inner cylindrical surface and an outer cylindrical surface, and to take the radiographic image, the radiation receiving device (400) bears against the inner cylindrical surface of the tubular object.

6. The method according to claim 3, wherein said tubular object forms part of a conduit in an industrial apparatus which is in operation.

7. The method according to claim 1, further comprising determining a material thickness (Mx) belonging to an intercept as the geometrical parameters of the object (200) to be inspected.

8. The method according to claim 7, wherein the material thickness belonging to a given intercept is calculated by $$MX = HVT * lgC/lg2,$$

wherein HVT (in units of meter) is the half-value thickness along the intercept used, and $$C = \frac{A_{Bq} * K_\gamma * t}{l^2 * DF} / 3.6 * 109,$$

wherein t stands for an exposure time (in units of second) of the object (200), DF is an absorbed dose (in units of Sv) in the piece of the radiation receiving device (400) belonging to the intercept chosen, l is a focus-to-pixel distance (in units of meter), $A_{Bq}$ represents an activity (in units of Bq) of the source (γ) of radiation applied and Kγ is a dose coefficient (in units of mSv·m²/GBq·h).

9. The method according to claim 1, wherein the change in the radiation receiving device (400) due to the absorbed radiation is represented with a quantity being proportional to the blackening of the radiation receiving device (400).

10. The method according to claim 3, wherein an insulation layer (300) is arranged between the outer cylindrical surface and the radiation receiving device (400), wherein said insulation layer forms a continuous coating.

11. The method according to claim 1, further comprising by comparing the obtained geometrical parameters of said object (200) to be inspected with defined values of the geometrical parameters of said object (200) to be inspected, generating a change in time and a change of extent of said geometrical parameters of the object (200) to be inspected.

12. The method according to claim 4, wherein said tubular object forms part of a conduit in an industrial apparatus which is in operation.

13. The method according to claim 1, further comprising using either X- or gamma-radiation for irradiating the object (200) to be inspected.

* * * * *